US008713574B2

(12) United States Patent
Creamer et al.

(10) Patent No.: US 8,713,574 B2
(45) Date of Patent: Apr. 29, 2014

(54) SOFT CO-PROCESSORS TO PROVIDE A SOFTWARE SERVICE FUNCTION OFF-LOAD ARCHITECTURE IN A MULTI-CORE PROCESSING ENVIRONMENT

(75) Inventors: Thomas E. Creamer, Boca Raton, FL (US); Curtis E. Hrischuk, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 1981 days.

(21) Appl. No.: 11/422,112

(22) Filed: Jun. 5, 2006

(65) Prior Publication Data

US 2007/0283349 A1    Dec. 6, 2007

(51) Int. Cl.
*G06F 9/46*    (2006.01)
*G06F 9/50*    (2006.01)

(52) U.S. Cl.
CPC ............ *G06F 9/5005* (2013.01); *G06F 9/5061* (2013.01)
USPC ........................................................ 718/104

(58) Field of Classification Search
CPC ............................. G06F 9/5005; G06F 9/5061
USPC ........................................................ 718/104
See application file for complete search history.

(56) References Cited

U.S. PATENT DOCUMENTS

| 5,341,477 | A | * | 8/1994 | Pitkin et al. ................... 709/226 |
| 5,377,337 | A |   | 12/1994 | Antognini et al. |
| 5,926,816 | A | * | 7/1999 | Bauer et al. ........................... 1/1 |
| 6,286,104 | B1 | * | 9/2001 | Buhle et al. ....................... 726/4 |
| 6,832,279 | B1 |   | 12/2004 | Potter et al. |
| 7,478,097 | B2 | * | 1/2009 | Emeis et al. ........................... 1/1 |
| 7,500,083 | B2 | * | 3/2009 | Trivedi et al. .................... 712/34 |
| 7,554,909 | B2 | * | 6/2009 | Raghunath et al. ............ 370/230 |
| 7,734,895 | B1 | * | 6/2010 | Agarwal et al. .................. 712/13 |
| 8,015,392 | B2 | * | 9/2011 | Naik et al. ........................ 712/32 |
| 2003/0158884 | A1 | * | 8/2003 | Alford, Jr. ....................... 709/104 |
| 2005/0081202 | A1 | * | 4/2005 | Brokenshire et al. .......... 718/100 |
| 2006/0080389 | A1 | * | 4/2006 | Powers et al. .................. 709/203 |

OTHER PUBLICATIONS

M. Krause, "Are processors free? Impact on RDMA and Protocol Off-Load Technologies", Proceedings of the Third IEEE International Symposium on Network Computing and Applications (NCA'04) (2004). Abstract only.
M. Neary, "Javelin++: Scalability Issues in Global Computing", JAVA 1999, San Francisco, California, USA, (1999).
J. A. Kahle, "Introduction to the Cell multiprocessor", IBM Journal of Research and Development, vol. 49, No. 4/5, Jul.-Sep. 2005.

* cited by examiner

*Primary Examiner* — Abdullah Al Kawsar
*Assistant Examiner* — Brian Chew
(74) *Attorney, Agent, or Firm* — Cuenot, Forsythe & Kim, LLC

(57) ABSTRACT

A method of distributing functions among a plurality of cores in a multi-core processing environment can include organizing cores of the multi-core processing environment into a plurality of different service pools. Each of the plurality of service pools can be associated with at least one function and have at least one core executing at least one soft co-processor that performs the associated function. The method further can include, responsive to a request from a primary processor to offload a selected function, selecting an available soft co-processor from a service pool associated with the selected function and assigning the selected function to the selected soft co-processor. The method also can include marking the selected soft co-processor as busy and, responsive to receiving an indication from the soft co-processor that processing of the selected function has completed, marking the selected soft co-processor as available.

18 Claims, 3 Drawing Sheets

SOFT CO-PROCESSORS TO PROVIDE A SOFTWARE SERVICE FUNCTION OFF-LOAD ARCHITECTURE IN A MULTI-CORE PROCESSING ENVIRONMENT

BACKGROUND

1. Field of the Invention

The present invention relates to processor and computing architectures having a plurality of cores and, more particularly, to offloading particular functions to different ones of the cores.

2. Description of the Related Art

Modern processors have evolved to multi-core architectures which utilize two or more on-chip processing cores (cores) per physical chip or manufacturing unit. Typically, multi-core processors are well suited to perform parallel programming operations such as matrix operations. Examples of such operations can include graphics, image processing, or cryptographic functions. The suitability of multi-core architectures in handling general business applications, however, is somewhat of an open issue. Such is the case as the identification of a particular multi-core architecture that is better, or perhaps best, suited to handle general business applications has not yet been determined. Further, the suitability of a given architecture may vary based upon the particular functions to be performed.

One proposed multi-core architecture places a plurality of homogeneous cores on a processor. Each core is configured to perform general functions. In other words, the cores are not optimized for a particular purpose. This architecture allows the same software to execute on each core, thereby facilitating concurrent execution of the same application code. Homogeneous core architectures have become popular, in part, due to the fact that software modifications are not required as each core utilizes the same instruction set.

One disadvantage of this approach is that performance optimization is difficult as each core is treated in the same manner. For example, temporal and spatial locality cannot be easily exploited at the core level since the entire application stack (e.g. system drivers, operating system processes, operating system services, business logic, etc.) executes on the same core. Spatial locality refers to the situation in which code executed by the core is stored in a memory that is local to the core, i.e. not in general memory, but rather in a level 1 or 2 cache, for instance. Temporal locality refers to the situation in which a core switches between several diverse tasks requiring the processor to continually flush and reload its local memory, resulting in lost time.

Another proposed architecture is one in which the main, or primary, processor(s) are supplemented with one or more co-processors. Each co-processor can be optimized, or hard-wired, to perform particular functions more efficiently. Examples of co-processors can include math, graphics, and network co-processors. Co-processors of this variety are essentially hardware implementations of algorithms. In any case, the functions to which the co-processor is suited can be offloaded from the main processor to the co-processor. Offloading a function, whether a graphics, networking, or other function, is software transparent in that the main processor passes execution off to the co-processor at a level that is below that of the software.

One disadvantage of this approach, however, is that additional capacity cannot be added without adding more physical resources to the system in the form of additional co-processors. Additionally, as the workload of the system shifts from one type of function to another, for example from encrypted traffic to compressed traffic, a hard-wired co-processor cannot adapt.

It would be beneficial to provide an architecture suited for multi-core processing environments which addresses the limitations described above.

SUMMARY OF THE INVENTION

The present invention provides method(s), system(s), and apparatus relating to distributing work within a multi-core processing environment. One embodiment of the present invention can include a method of distributing functions among a plurality of cores in such an environment. The method can include organizing cores of the multi-core processing environment into a plurality of different service pools. Each of the plurality of service pools can be associated with at least one function and have at least one core executing at least one soft co-processor that performs the associated function. The method further can include, responsive to a request from a primary processor to offload a selected function, selecting an available soft co-processor from a service pool associated with the selected function and assigning the selected function to the selected soft co-processor. The method also can include marking the selected soft co-processor as busy and, responsive to receiving an indication from the soft co-processor that processing of the selected function has completed, marking the selected soft co-processor as available.

Another embodiment of the present invention can include a system for distributing functions among a plurality of cores in a multi-core processing environment. The system can include a first service pool including at least one core preloaded with at least one soft co-processor for performing a first function and a second service pool including at least one core preloaded with at least one soft co-processor for performing a second function. The system also can include a primary processor that issues requests to offload particular functions to soft co-processors executing within the cores as well as a core manager that, in response to a request to offload a function from the primary processor, selects an available soft co-processor from the first or second service pool according to the function to be offloaded by the primary processor.

Yet another embodiment of the present invention can include a machine readable storage being programmed to cause a machine to perform the various steps and/or functions described herein.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
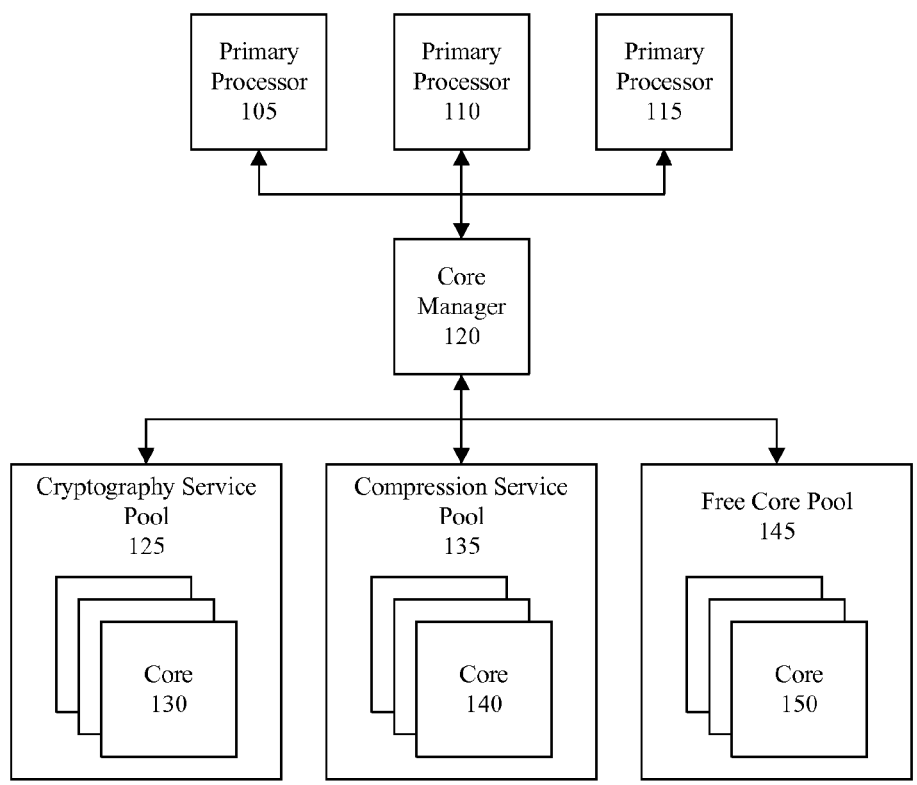
FIG. 1 is a block diagram illustrating a system for offloading functions within a multi-core processing environment in accordance with one embodiment of the present invention.

FIG. 1 is a block diagram illustrating a system 100 for offloading functions within a multi-core processing environment in accordance with one embodiment of the present invention. The system 100 can be implemented using a variety of different architectures. In one embodiment, for example, the system 100 can be implemented using a single, multi-core processor, where each element is implemented using a core of the processor. In another embodiment, the system 100 can be implemented using a plurality of processors. In that case, some elements of system 100 can be implemented as single core processors, such as the primary processors to be described herein, while other elements, i.e. the cores, are cores of one or more multi-core processors.

In yet another embodiment, the system 100 can be implemented using a Cell Multiprocessor, or cell-like multiprocessor, as described in "Introduction to the Cell Multiprocessor", by J. A. Kahle, et al., IBM Research and Development Journal, vol. 49, no. 4/5 (July/September 2005), which is incorporated herein by reference. In an embodiment using the Cell Multiprocessor, the entirety of system 100 can be implemented using one or more Cell multiprocessor(s) or one or more Cell processor(s) in combination with one or more other processors. In illustration, it may be the case that one or more Cell multiprocessors, or Cell-like multiprocessors, are disposed upon a processor card which can be integrated, or "plugged-into", a computing system having a conventional processor, whether single or multi-core. In that case, the Cell multi-processor(s) can provide the cores needed to implement the various embodiments disclosed herein.

The embodiments disclosed herein provide a method(s), system(s), and apparatus, for offloading functions or services from one processor, or core, to one or more other cores that have been configured as soft co-processors. As such, it should be appreciated that the present invention is not intended to be limited by the specific processors used. The examples discussed above and throughout this specification are intended to illustrate to one skilled in the art various ways of implementing and applying the embodiments disclosed herein.

Continuing with FIG. 1, system 100 can include one or more primary processors 105, 110, and 115, a core manager 120, as well as several different pools 125, 135, and 145. In this case, system 100 includes a cryptography service pool 125 having one or more cores 130, a compression service pool 135 having one or more cores 140, as well as a free core pool 145 having one or more cores 150.

As used herein, a primary processor can refer to a processor that executes business logic or other generalized logic. The primary processor can be implemented as a core within a multi-core processor, whether a general-purpose core or a specialized core, as a separate processor, whether single or multi-core, etc. Any of a variety of different processor and/or core types can function as the primary processor(s) so long as such processor(s) are configured, or programmed, to offload functions to one or more of the other cores as will be described herein in greater detail. Accordingly, each of the primary processors 105-115 can be configured in this manner. Still, it should be appreciated that the embodiments described herein are applicable whether there is a single primary processor or a plurality of primary processors as shown. In this regard, the particular number of primary processors depicted in FIG. 1 has been used for purposes of illustration only and is not intended to limit the present invention.

The core manager 120, similar to the primary processors 105-115, can be implemented as a core within a multi-core processor, a separate processor, etc. The core manager 120 serves as an interface between the core pools 125, 135, and 145, and the primary processors 105-115. More particularly, the primary processors 105-115, responsive to determining that a particular service or function must be performed, can issue a request to the core manager 120 asking to offload that service, or function, to an available core. The core manager 120, responsive to the request from the primary processor 105, for example, can identify the particular function being requested, and select an available core from one of the core pools 125, 135, or 145 that includes cores configured to perform the function to be offloaded or a core to be loaded with a particular soft co-processor.

The terms "service" and "function" are used interchangeably in this specification. Both terms are intended to refer to particular programs, or logic, that perform one or more specific, and typically related, tasks. The two examples used in system 100 are cryptographic services and compression services. Other services, however, such as TCP/IP, graphic rendering/processing, audio functions, video coding/decoding, etc., can be included. Accordingly, the particular number and/or type of services provided, and thus, the number of service pools, is not intended to limit the present invention.

The service pools 125 and 135 are collections of one or more cores that have been similarly, if not identically, configured. The cores of each service pool 125, 135 are configured to perform a particular function, or set of functions. In accordance with system 100, cores of a multi-core processing environment can be allocated into service pools to perform selected tasks. As each core can include its own local memory, i.e. a level 1 or 2 cache for example, each core of a service pool can be loaded with code for performing a specific function or set of functions. In this sense, each core can be said to be loaded with a soft co-processor, or configured as a soft co-processor, in reference to the code and/or data that is preloaded into the core memory for performing the specific function(s) to be offloaded to that core. Thus, with reference to FIG. 1, each core 130 in the cryptography service pool 125 can be loaded with a soft co-processor for performing cryptographic functions such as encryption and/or decryption. Similarly, each core 140 within the compression service pool 135 can be loaded with a soft co-processor for performing compression related functions such as compression and/or decompression.

The free core pool 145 can include any cores 150 that have not been allocated to perform a particular function. For example, cores 150 in the free core pool 145 are not preloaded with soft co-processors for performing cryptography services or compression services. Cores 150 are, however, available for allocation to a service pool such as cryptography service pool 125 or compression service pool 135 if the core manager 120 determines that demand for such services is high or exceeds the available soft co-processors in such service pools. By the same token, if the cryptography service pool 125 or the compression service pool 135 includes excess capacity in terms of the number of cores included in the service pool, cores can be re-allocated back to the free core pool 145.

In operation, when a primary processor, such as primary processor 105, executes business logic and determines a need for a particular function that is provided by cores of one of the service pools 125 or 135, the primary processor 105 can issue a request to the core manager 120. The request from the primary processor 105 is to offload the function to an available core. Thus, if the primary processor 105 determines a need for a cryptography function, the primary processor 105 issues a request to offload such tasks.

The request is issued to the core manager 120. The core manager 120, in turn, identifies the particular function being requested by the primary processor 105. The core manager 120 then can identify the appropriate service pool as well as whether any cores are available within that service pool which can be assigned to the function that the primary processor 105 seeks to offload. Further detail regarding the offloading of a service from the primary processor(s) to an available core will be described in further detail herein.

By assigning functions to cores that are already loaded with soft co-processors configured and/or optimized to perform such functions, several advantages can be achieved. One advantage is spatial locality, which refers to the behavior of a computer program. Spatial locality states, in general, that when a computer program accesses a particular memory location, the computer program is likely, in the near future, to access a memory location that is near the accessed memory location. By including all, or at least most, code and/or data needed to perform the designated function, i.e. the soft co-processor, in the local memory of the core assigned to that task, spatial locality can be exploited to achieve better performance. This relieves the core from having to load instructions from general memory which can significantly increase execution time.

Another advantage is temporal locality, which also refers to computer program behavior. Temporal locality states, in general, that when a computer program accesses a memory location, the computer program will likely, in the near future, access the same memory location again. For example, when a general purpose processor multi-tasks between several diverse tasks such as a calendar application, a spreadsheet, etc., the processor must continually flush and reload its local memory. When the processor switches from the spreadsheet application to the calendar, the contents of the memory relating to the spreadsheet application are flushed. The processor memory is then loaded with the code and/or data necessary for performing the functions relating to the calendar program. This cycle of flushing and reloading memory to perform conventional multitasking can result in significant increases in execution time and fails to exploit the concept of spatial locality.

With respect to the embodiments disclosed herein, continually flushing and reloading the local memory contents of a core that is assigned an offloaded function is not necessary. This is because the core is already loaded or configured with the soft co-processor that is suited or optimized for performing the designated, or offloaded, function. Except in cases of load balancing to be discussed herein in further detail, a core is already preloaded with a soft co-processor and memory flushing/reloading is not necessary. Spatial locality is exploited to achieve better performance.

Figure 2:
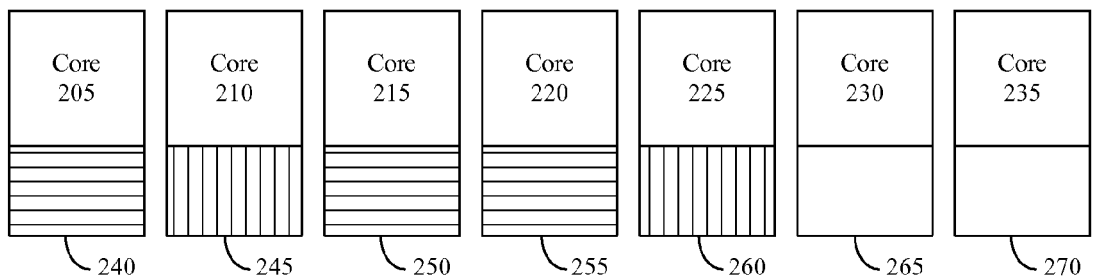
FIG. 2 is block diagram illustrating a plurality of cores which is useful for understanding the present invention.

FIG. 2 is block diagram illustrating a plurality of cores 200 which is useful for understanding the present invention. FIG. 2 depicts the classification, or grouping, of cores into various service pools. Each of the cores 205-235 can include a local memory 240-270 respectively. Each of the local memories 240-260 can be loaded with a soft co-processor, thereby configuring each corresponding core 205-225 to perform the function(s) relating to the loaded soft co-processor. The local memories 240-270 have been marked to indicate those cores which are configured to perform a common function and, thus, are within a same pool. Cores 205, 215, and 220, as shown, are within a same service pool as each respective local memory 240, 250, and 255 has been loaded with a same soft co-processor for performing, for example, cryptographic services. Cores 210 and 225 are within a same service pool as each respective local memory 245 and 260 has been loaded with a same soft co-processor for performing, for example, compression services. Cores 230 and 235 are within the free core pool as each respective memory 265 and 270 has not been preloaded with a soft co-processor.

In one embodiment of the present invention, the usage of soft co-processors and/or cores can be monitored and evaluated. This information can be stored within, and used by, the core manager to allocate cores to particular service pools upon startup and load/initialize such cores with appropriate soft co-processors. While in operation, however, it should be appreciated that cores can be re-allocated from one pool to another, including the free core pool, according to soft co-processor usage as monitored by the core manager. Thus, if the core manager determines that the compression service pool has a surplus of soft co-processors, i.e. there are more than a given number of unused or available soft co-processors in the service pool at any given time, one or more cores can be re-allocated from the compression service pool to another service pool that may have a need for additional cores and soft co-processors. Still, cores can be re-allocated from the compression service pool to the free core pool if no other service pool has a need for additional cores. Cores also can be allocated from the free core pool to a service pool to perform a designated function. In any case, soft co-processor and core usage can be monitored in a number of ways, for example by detecting surplus cores, detecting wait times for obtaining available cores or soft co-processors in a given service pool, or by monitoring incoming requests from primary processor(s). The particular manner in which soft co-processor and core usage is monitored and measured is not intended to limit the present invention.

Figure 3:
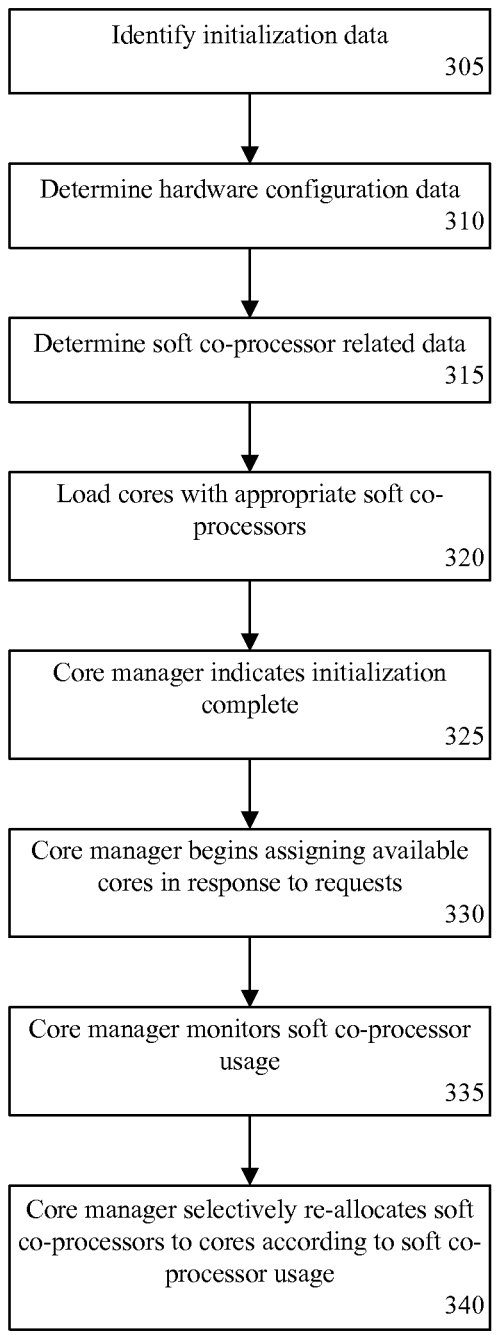
FIG. 3 is a flow chart illustrating a method of configuring cores in accordance with another embodiment of the present invention.

FIG. 3 is a flow chart illustrating a method 300 of configuring cores in accordance with another embodiment of the present invention. The method 300 can be implemented in a system such as the system described with reference to FIG. 1. The method 300 can be performed to initialize the system, for example upon power-up or after a system reset.

Accordingly, the method 300 can begin in step 305 where initialization data can be identified. Though the initialization data can be specified in any of a variety of different formats, in one embodiment, the initialization data can be specified using Extensible Markup Language. This data can be stored in some form of persistent memory and can be accessed by, and/or loaded into, the core manager.

In step 310, the core manager can determine hardware configuration data from the initialization data. The hardware configuration data can specify a number of different parameters of the system including, but not limited to, the number of processors in the system, the number of cores in the system, the number of cores on a per chip or processor basis, as well as the number of threads each core can execute concurrently.

In step 315, the core manager can determine soft co-processor related data from the initialization data. The soft co-processor related data, which can be specified on a per soft co-processor type basis, can include, but is not limited to, a priority value, an initial number of threads and a maximum number of threads to be handled by a given soft co-processor type, etc. The soft co-processor data further can indicate the initial allocation of soft co-processors to cores, i.e. the number of cores in each service pool, upon initialization of the system.

In step 320, the core manager can begin loading the local memories of cores with soft co-processors as determined from the initialization data. As noted, the core manager receives requests from the primary processor(s). These requests can be used to determine, at least an initial, allocation of soft co-processors to cores. The core manager manages the initialization of cores, i.e. the loading of soft co-processors into selected cores. In one embodiment, a single soft co-processor can be loaded into each core. In another embodiment, more than one soft co-processor can be loaded into a given core according to the ability of the core to process or handle more than one thread. The loading of soft co-processors into cores can be handled on a per core basis according to the capability of each individual core. Still, cache interference should be minimized and can depend upon the size of the core memory (or cache). Accordingly, a one-to-one correspondence between soft co-processors and cores may be preferred. It also should be appreciated that the embodiments disclosed herein can include more service pool types than cores in the system. This can be the case as the core manager can dynamically allocate cores among service pools. In such an embodiment, at any given time, one or more service pools can remain empty, i.e. include no cores, until such time as a need arises.

In step 325, when the initialization of cores is complete, the core manager can provide an indication of this condition to the primary processor(s). Accordingly, in step 330, the core manager can begin assigning, or matching, available cores to functions being offloaded in response to requests from the primary processor(s). The core manager, as operation continues, can maintain data which indicates how many cores are within each service pool, are in the free pool, are currently in use in a given service pool, and any other information necessary for tracking core availability.

In step 335, the core manager also can begin monitoring the requests for offloading functions received from the primary processor(s). As noted, these requests can be used to dynamically change allocation of soft co-processors to cores during operation as well as change the allocation data specified as part of the initialization data. In step 340, the core manager can optionally re-allocate soft co-processors to cores according to data collected in step 335. As noted, cores can be moved between service pools and between the free core pool and one or more service pools.

As noted, cores can be re-allocated as a result of any of a variety of different factors relating to soft co-processor and/or core usage. In one embodiment, if a service pool has too few cores, one or more cores can be configured with the soft co-processor corresponding to that service pool. The additional core(s) can be allocated from the free core pool or another service pool having an overage of available cores. This re-allocation can be based upon, for example, detecting a high rate of requests for offloading functions directed to an "in demand" service pool, i.e. the service pool experiencing the core shortage, detecting conditions in which the core manager waits for an available core from the "in-demand" service pool, as well as detecting developing increasing or decreasing trends in core/soft co-processor usage.

By the same token, cores can be moved back to the free core pool from a service pool under circumstances such as the core manager detecting a reduced rate of primary processor requests for offloading functions to that service pool, the core manager detecting that the service pool is maintaining a number of available cores which exceeds a predetermined maximum over a given time period, or the like.

In another embodiment of the present invention, the core manager is not implemented using a dedicated core. In that case, the core manager can be implemented as a portion of code that a soft co-processor runs when that soft co-processor has finished executing an assigned service. In this manner, a dedicated core is not required for implementation of the core manager.

Figure 4:
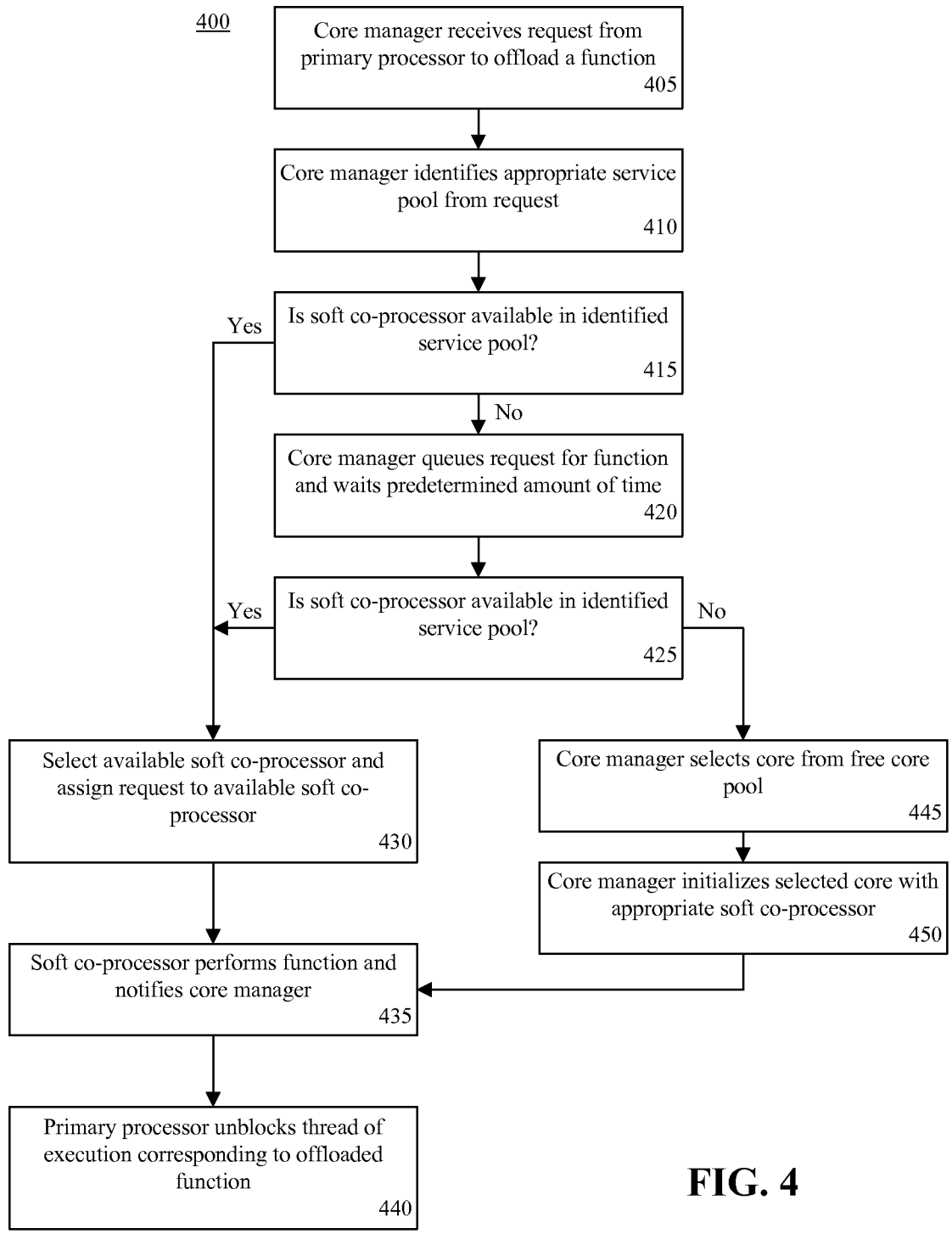
FIG. 4 is a flow chart illustrating a method of offloading functions to cores in accordance with another embodiment of the present invention.

FIG. 4 is a flow chart illustrating a method 400 for offloading functions to cores in accordance with another embodiment of the present invention. The method 400 can begin in a state in which the system has been initialized and the core manager can receive requests for offloading functions from one or more primary processors within the system.

Accordingly, in step 405, the core manager can receive a request from a primary processor to offload a function. The request can specify data such as the program for which the work is to be performed, the function to be offloaded, as well as a type of the function to be offloaded. In step 410, the core manager can identify an appropriate service pool from the request. As noted, the request can indicate a particular function to be performed as well as a type. For example, the request can indicate a type of "cryptography service", which can be mapped to the cryptography service pool. The requested service can be more specific, for instance, decryption, thereby indicating the particular function to be performed by the soft co-processor assigned to the request. From this information, the core manager can determine that the cryptography service pool is the proper pool and that decryption is being requested.

In step 415, the core manager can determine whether any cores are available within the identified service pool. More particularly, the core manager can determine whether any cores, being loaded with the soft co-processor for cryptography services, are not currently assigned to other requests. If one or more cores are available, the method can proceed to step 430, where an available soft co-processor is selected and associated with the request from the primary processor.

By selecting an available soft co-processor in step 430, the core manager can pass a handle to an object in shared memory that is to be processed by the soft co-processor. In general, shared memory can refer to general RAM or the primary memory used by the primary processor. Information in primary memory also can be accessed directly or transferred into the local memory for the appropriate core using Direct Memory Access (DMA) transfer protocol. With respect to a Cell Multiprocessor architecture, local memories for the cores can be pipelined to one another.

The core manager indicates to the requesting primary processor that the function has been offloaded to a soft co-processor. The core manager notes that the soft co-processor has been assigned to the primary processor. The primary processor, in turn, blocks the thread of execution corresponding to the offloaded service being executed within the soft co-processor. This allows the primary processor to work on other tasks while awaiting results from the soft co-processor.

In another embodiment, the thread of execution within the primary processor that corresponds to the offloaded service need not be blocked. For example, an asynchronous application programming interface (API) call can be used where the caller, i.e. the primary processor or program executing therein, hands off the function to the soft co-processor via the core manager. The caller does not wait for the call to complete and can perform other work in the meantime. In some cases, the caller may not ask for a response to the asynchronous request at all. In other cases, the caller may do some work and periodically poll to see if it has received a response.

In step 435, the soft co-processor performs the requested service by operating on the object in shared memory. Upon completion, the soft co-processor can indicate that it has completed execution of the function to the core manager. The core manager logs the soft co-processor as now being available for subsequent requests and further notifies the requesting primary processor that execution has finished. It should also be appreciated that if so desired, the soft co-processor can notify the primary processor that processing has completed as well as provide any results to the primary processor directly. In step 440, the primary processor can obtain results by accessing the object in shared memory and also can unblock the thread of execution corresponding to the offloaded function.

Referring back to step 415, in the case where a soft co-processor in the identified service pool is not available, the method can proceed to step 420. In step 420, the core manager can queue the received request and await a predetermined amount of time. In step 425, after the predetermined amount of time has elapsed, the core manager can again determine whether a soft co-processor in the identified service pool is available. If so, the method can proceed to step 430 and continue as described. If not, the method can proceed to step 445.

In step 445, the core manager selects a free core from the free core pool. In step 450, the core manager initializes the selected core with a soft co-processor corresponding to the type indicated by the request from the primary processor. By initializing the core with the appropriate soft co-processor, the core manager effectively adds a core, or capacity, to the identified service pool that had no available soft co-processors. That is, the free core is allocated to the identified service pool. After step 450, the method can proceed to step 435 to continue as described herein.

The embodiments disclosed herein provide method(s), system(s), and apparatus, relating to the distribution of work among a plurality of different cores. Cores can be grouped into service pools to perform various functions and preloaded with soft co-processors. By offloading functions from one processor to a core preconfigured with a soft co-processor, efficiencies with respect to temporal and spatial locality can be achieved.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, source code, object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising, i.e. open language.

This invention can be embodied in other forms without departing from the spirit or essential attributes thereof. Accordingly, reference should be made to the following claims, rather than to the foregoing specification, as indicating the scope of the invention.

What is claimed is:

1. A method of allocating a plurality of cores in a multi-core processing environment, comprising:
   allocating, dynamically, the plurality of cores into a plurality of different service pools, each of the plurality of service pools corresponding to a particular function;
   loading, into each of the plurality of cores, a soft co-processor corresponding to a particular function associated with a particular service pool to which a particular core is assigned;
   receiving, from a primary processor, a request to offload a selected function;
   determining that a service pool associated with the selected function does not include an available soft co-processor to perform the selected function;
   reallocating a core, from a free core pool, to the service pool associated with the selected function;
   loading, into the reallocated core, a soft co-processor configured to perform the selected function;
   selecting, from the service pool associated with the selected function, an available soft co-processor; and
   assigning the selected co-processor to perform the selected function.

2. The method of claim 1, wherein
   more than one single core, from the plurality of cores, is assigned to one of the plurality of different services pools, and
   each of the more than one single core are loaded with an identical soft co-processor corresponding to a particular function associated with the one of the plurality of different service pools to which the more than one single core are assigned.

3. The method of claim 1, wherein the selected soft co-processor is marked as busy until the selected function is completed.

4. The method of claim 1, wherein the plurality of cores are dynamically allocated based upon usage of soft co-processors loaded into the plurality of cores.

5. The method of claim 1, wherein the plurality of cores are located within a single multi-core processor.

6. The method of claim 5, wherein the primary processor is located within a single core processor.

7. The method of claim 1, wherein the plurality of cores are located within a cell-like multiprocessor.

8. A computer hardware system, comprising:
a plurality of cores;
a primary processor; and
a core manager, wherein the core manager is configured to perform:
- allocating, dynamically, the plurality of cores into a plurality of different service pools, each of the plurality of service pools corresponding to a particular function;
- loading, into each of the plurality of cores, a soft co-processor corresponding to a particular function associated with a particular service pool to which a particular core is assigned;
- receiving, from the primary processor, a request to offload a selected function;
- determining that a service pool associated with the selected function does not include an available soft co-processor to perform the selected function;
- reallocating a core, from a free core pool, to the service pool associated with the selected function;
- loading, into the reallocated core, a soft co-processor configured to perform the selected function;
- selecting, from the service pool associated with the selected function, an available soft co-processor; and
- assigning the selected co-processor to perform the selected function.

9. The system of claim 8, wherein
more than one single core, from the plurality of cores, is assigned to one of the plurality of different services pools, and
each of the more than one single core are loaded with an identical soft co-processor corresponding to a particular function associated with the one of the plurality of different service pools to which the more than one single core are assigned.

10. The system of claim 8, wherein the selected soft co-processor is marked as busy until the selected function is completed.

11. The system of claim 8, wherein the plurality of cores are dynamically allocated based upon usage of soft co-processors loaded into the plurality of cores.

12. The system of claim 8, wherein the plurality of cores are located within a single multi-core processor.

13. The system of claim 12, wherein the primary processor is located within a single core processor.

14. The system of claim 8, wherein the plurality of cores are located within a cell-like multiprocessor.

15. A computer program product comprising a computer usable storage memory having stored therein computer usable program code for allocating a plurality of cores in a multi-core processing environment, the computer usable program code, which when executed by a computer hardware system, causes the computer hardware system to perform:
- allocating, dynamically, the plurality of cores into a plurality of different service pools, each of the plurality of service pools corresponding to a particular function;
- loading, into each of the plurality of cores, a soft co-processor corresponding to a particular function associated with a particular service pool to which a particular core is assigned;
- receiving, from a primary processor, a request to offload a selected function;
- determining that a service pool associated with the selected function does not include an available soft co-processor to perform the selected function;
- reallocating a core, from a free core pool, to the service pool associated with the selected function;
- loading, into the reallocated core, a soft co-processor configured to perform the selected function;
- selecting, from the service pool associated with the selected function, an available soft co-processor; and
- assigning the selected co-processor to perform the selected function.

16. The computer program product of claim 15, wherein
more than one single core, from the plurality of cores, is assigned to one of the plurality of different services pools, and
each of the more than one single core are loaded with an identical soft co-processor corresponding to a particular function associated with the one of the plurality of different service pools to which the more than one single core are assigned.

17. The computer program product of claim 15, wherein the selected soft co-processor is marked as busy until the selected function is completed.

18. The computer program product of claim 15, wherein the plurality of cores are dynamically allocated based upon usage of soft co-processors loaded into the plurality of cores.

* * * * *